United States Patent
Chen et al.

(10) Patent No.: US 8,972,706 B2
(45) Date of Patent: *Mar. 3, 2015

(54) PERFORMANCE IN PREDICTING BRANCHES

(75) Inventors: Wen-Tzer T. Chen, Austin, TX (US); Diane G. Flemming, Pflugerville, TX (US); William A. Maron, Austin, TX (US); Mysore S. Srinivas, Austin, TX (US); David B. Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 893 days.

This patent is subject to a terminal disclaimer.

(21) Appl. No.: 13/116,515

(22) Filed: May 26, 2011

(65) Prior Publication Data

US 2012/0303938 A1    Nov. 29, 2012

(51) Int. Cl.
*G06F 15/00*    (2006.01)
*G06F 7/38*    (2006.01)
*G06F 9/00*    (2006.01)
*G06F 9/44*    (2006.01)
*G06F 9/38*    (2006.01)

(52) U.S. Cl.
CPC ............... *G06F 9/3844* (2013.01); *G06F 9/38* (2013.01)
USPC ........................................ 712/239; 712/240

(58) Field of Classification Search
None
See application file for complete search history.

(56) References Cited

U.S. PATENT DOCUMENTS

| | | | |
|---|---|---|---|
| 5,659,752 A | 8/1997 | Heisch et al. | |
| 6,092,187 A * | 7/2000 | Killian | 712/239 |
| 6,418,525 B1 * | 7/2002 | Charney et al. | 711/213 |
| 6,662,360 B1 | 12/2003 | Hay et al. | |
| 7,657,723 B2 | 2/2010 | Klein | |
| 7,730,469 B1 | 6/2010 | Boucher | |
| 7,840,952 B2 | 11/2010 | Klein | |
| 2002/0194464 A1 * | 12/2002 | Henry et al. | 712/239 |
| 2008/0052500 A1 * | 2/2008 | Glew | 712/239 |
| 2014/0156979 A1 | 6/2014 | Chen et al. | |

OTHER PUBLICATIONS

Chang et al. (Branch Classification: a New Mechanism for Improving Branch Predictor Performance, published 1994, pp. 22-31).*
"Profile-directed Feedback (PDF)", IBM, pp. 1-2 retrieved Apr. 20, 2011 www.serc.iisc.ernet.in/.../ug50.htm.
Office Action, dated Oct. 23, 2014, regarding U.S. Appl. No. 14/174,966, 22 pages.

* cited by examiner

*Primary Examiner* — George Giroux
(74) *Attorney, Agent, or Firm* — Yee & Associates, P.C.; Damion Josephs

(57) ABSTRACT

A data processing system and computer program product for processing instructions. The instructions are processed by a processor unit while using a first table in a plurality of tables to predict a set of instructions needed by the processor unit after processing of a conditional instruction. An identification is formed that a rate of success in correctly predicting the set of instructions when using the first table is less than a threshold number. A sequence of the instructions being processed by the processor unit is searched for an instruction that matches a marker in a set of markers for identifying when to use the plurality of tables. An identification that the instruction that matches the marker is formed. A second table from the plurality of tables referenced by the marker is identified. The second table is used in place of the first table.

8 Claims, 8 Drawing Sheets

BRANCH HISTORY TABLE PRIMER TABLE

| SET OF PHASE MARKERS | SET OF BRANCH HISTORY TABLE IDENTIFIERS |
|---|---|
| X | cpy1 |
| Y | cpy2 |
| Z | cpy3 |

402 — SET OF PHASE MARKERS
404 — SET OF BRANCH HISTORY TABLE IDENTIFIERS

| IDENTIFIER | HISTORY | | | | | |
|---|---|---|---|---|---|---|
| | 1 | 0 | 0 | 1 | 0 | 0 |
| | 1 | 0 | 1 | 0 | 1 | 0 |
| | 0 | 0 | 1 | 0 | 0 | 1 |
| | 0 | 1 | 0 | 1 | 0 | 1 |

502 — IDENTIFIER
504 — HISTORY
506, 508, 510, 512

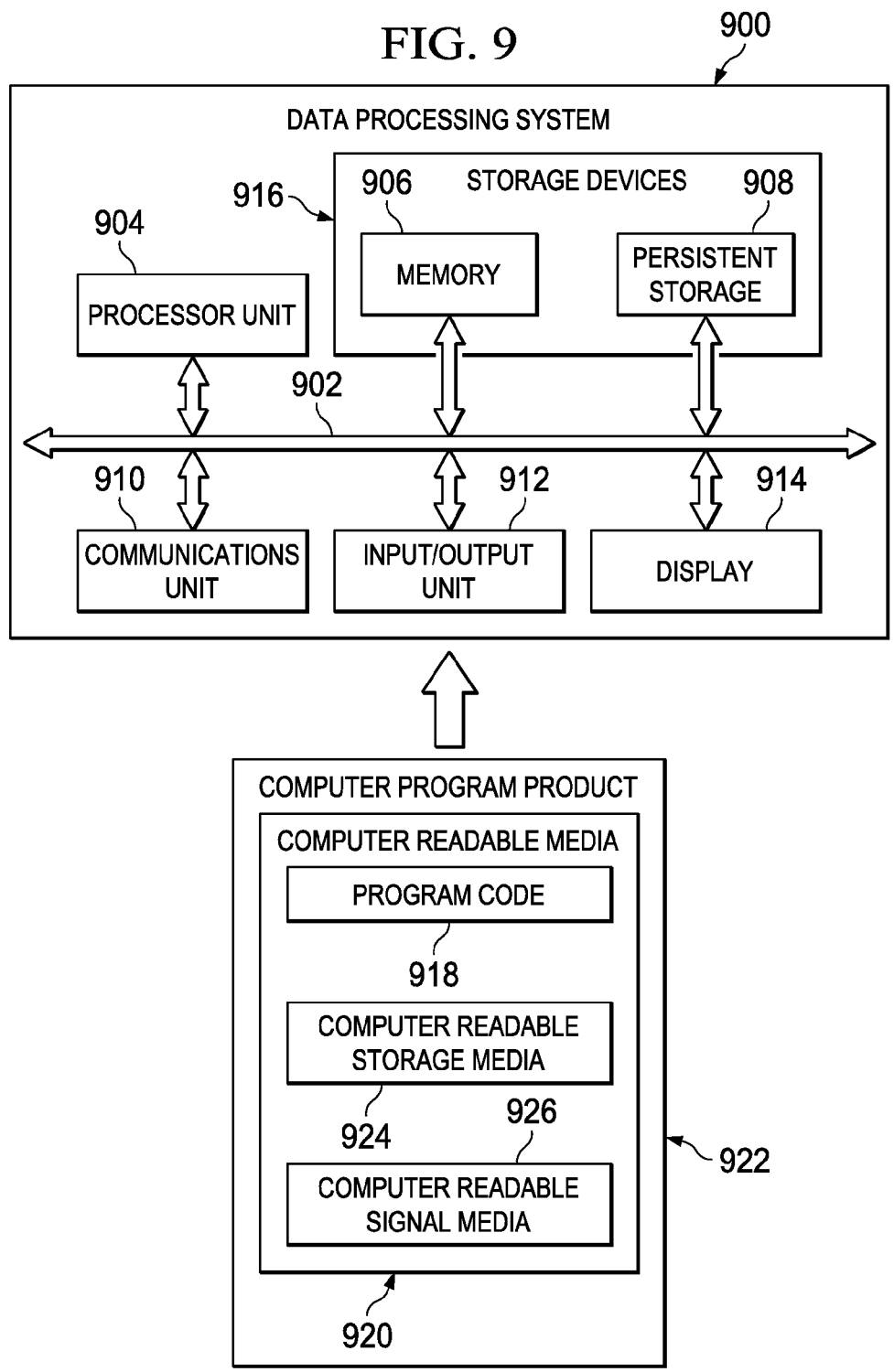

PERFORMANCE IN PREDICTING BRANCHES

BACKGROUND

1. Field

The disclosure relates generally to processing instructions and more specifically to predicting instructions that will be needed by a processor unit following processing of a conditional instruction. Still more specifically, the present disclosure relates to control flow and predicting branches of a program that will be used.

2. Description of the Related Art

A program is a sequence of instructions for a process that performs certain tasks when processed by a processor unit. The speed with which the program is able to perform the tasks is often dependent on the efficiency of the processor unit. When an instruction is needed by the processor unit, the processor unit retrieves the instruction from a cache of the processor unit. If the instruction needed by the processor unit is not present in the cache, the instruction can be retrieved from another storage device, such as memory, for example. Retrieving instructions from memory can take a longer amount of time than retrieving instructions from a cache. The processor unit may have to wait while the instruction is retrieved. As a result, the performance of the program may slow down.

Computer systems often use different forms of instruction prediction to speed up the performance of a program. For example, most recently used instructions from a program may be kept in the cache for use by the processor unit. In another example, instructions that are commonly processed in a sequence may be placed in the cache in the order of the sequence. However, caches have limited sizes. Thus, only a limited number of instructions may be stored in the cache for processing by the processor. Prediction of the correct instructions is important because incorrectly predicted instructions waste space in the cache, the processor pipeline, and processing cycles. A "number", as used herein with reference to an item, means one or more items.

Depending on the task being performed, instructions from the program may be needed in any number of different sequences. For example, processing of a conditional instruction may result in two different possible sequences being needed. A conditional instruction is an instruction that, when processed, results in one of at least two different instructions being needed by the processor unit next. For example, a conditional instruction may contain an "if-then" statement. If the condition in the "if" statement is true, "then" the program will follow one set of instructions, otherwise the program may follow a different set of instructions. A "set", as used herein with reference to an item, means one or more items.

To improve efficiency, many processor units use an instruction pipeline. Use of an instruction pipeline is a technique that allows the processor unit to process different stages of more than one instruction at the same time. Processing of a single instruction can require more than one step performed by the processor. For example, processing of an instruction may include four stages. Rather than waiting until processing of an instruction is complete, the processor unit can begin processing stages of other instructions. As a result, the processor unit may be able to finish processing one instruction each cycle.

Another performance technique is to prefetch the pipeline with an upcoming instruction set. For example, a branch in the program, due to a conditional statement, may result in one of at least two sets of instructions being chosen to be loaded into the pipeline. However, incorrectly predicting the result of instructions needed following a conditional instruction can be costly. If the instructions needed following the conditional instruction are incorrectly predicted, any processing of the incorrectly predicted instructions is wasted. The instruction pipeline will need to be flushed. The processor unit will then need to fetch the correct instruction set needed following the conditional instruction. Both of these steps waste processor unit cycles and reduce the efficiency of the processor unit.

Accordingly, it would be advantageous to have a method and apparatus which take into account one or more of the issues discussed above as well as possibly other issues.

SUMMARY

The different illustrative embodiments provide a data processing system and computer program product for processing instructions. The instructions are processed by a processor unit while using a first table in a plurality of tables to predict a set of instructions needed by the processor unit after processing of a conditional instruction. An identification is formed that a rate of success in correctly predicting the set of instructions when using the first table is less than a threshold number. A sequence of the instructions being processed by the processor unit is searched for an instruction that matches a marker in a set of markers for identifying when to use the plurality of tables. An identification that the instruction matches the marker is formed. A second table from the plurality of tables referenced by the marker is identified. The second table is used in place of the first table.

BRIEF DESCRIPTION OF THE SEVERAL VIEWS OF THE DRAWINGS

FIG. 4 is an illustration of a branch history table primer table in accordance with an illustrative embodiment;

FIG. 5 is an illustration of a branch history table in accordance with an illustrative embodiment;

FIG. 9 is an illustration of a data processing system in accordance with an illustrative embodiment.

DETAILED DESCRIPTION

Figure 1:
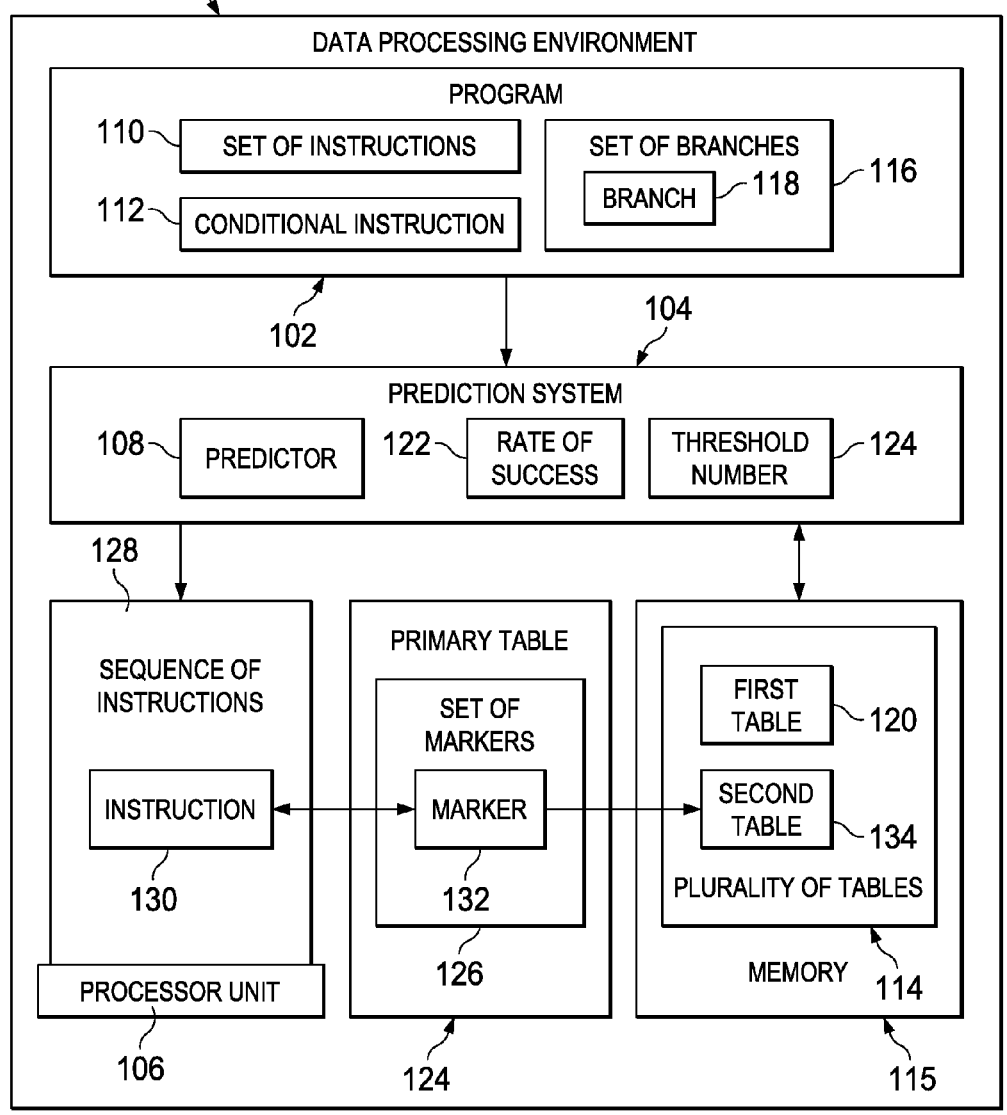
FIG. 1 is a block diagram of a data processing environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that it is desirable to correctly predict instructions needed by a processor unit following processing of a conditional instruction. A conditional instruction is a statement whose execution by a processor unit results in a choice being made about two or more different paths that should be followed. Until the statement is executed, it is not known for certain which of the different paths will be followed. As a result, correctly predicting the path followed can improve the efficiency of the processor unit.

The different illustrative embodiments recognize that one solution may involve obtaining profile information about paths commonly followed during processing of a program. For example, a computer system may monitor processing of conditional instructions and the paths followed. The computer system may be able to identify a frequency or pattern that an individual path has followed after execution of a certain conditional instruction. The information about the paths and conditional instructions may be stored in a table for use by the processor unit in predicting paths followed. Over time, the computer system may be able to improve performance in correctly predicting paths followed.

However, different illustrative embodiments recognize and take into account that methods of using profile information may not be reliable if the program has not been used a certain number of times. As discussed above, incorrectly predicting instructions can be costly. Processor units using instruction pipelines can waste cycles processing instructions that are not needed. While the net effect on the current program may be the same, these cycles could be used by other programs or threads. As a result, the rate of success in correctly predicting instructions may need to be much higher than a rate of incorrectly predicting instructions to justify use of the prediction method.

Thus, the different illustrative embodiments provide a data processing system and computer program product for processing instructions. The instructions are processed by a processor unit while using a first table in a plurality of tables to predict a set of instructions needed by the processor unit after processing of a conditional instruction. An identification is formed that a rate of success in correctly predicting the set of instructions when using the first table is less than a threshold number. A sequence of the instructions being processed by the processor unit is searched for an instruction that matches a marker in a set of markers for identifying when to use the plurality of tables. An identification that the instruction that matches the marker is formed. A second table from the plurality of tables referenced by the marker is identified. The second table is used in place of the first table.

With reference now to FIG. 1, an illustration of a block diagram of a data processing environment is depicted in accordance with an illustrative embodiment. Data processing environment 100 is an environment in which illustrative embodiments may be implemented.

In these illustrative embodiments, data processing environment 100 includes program 102, prediction system 104, and processor unit 106. Program 102 is instructions that are written to perform certain functions in data processing environment 100. For example, without limitation, program 102 may be a computer program, a software program, an application, a thread, a plug-in, and/or any other sequence of instructions for performing functions in a computer system.

Prediction system 104 predicts instructions from program 102 that will be processed by processor unit 106. Prediction system 104 may include both hardware and software. In these illustrative embodiments, prediction system 104 includes predictor 108. Predictor 108 is hardware associated with processor unit 106. A first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Predictor 108 predicts set of instructions 110 that will be needed by processor unit 106 following processing of conditional instruction 112. For example, without limitation, predictor 108 may be a branch predictor, a branch target predictor, an instruction prefetch device, or any other suitable device for predicting set of instructions 110 that will be needed by processor unit 106 following processing of conditional instruction 112. Predictor 108 prefetches set of instructions 110 that were predicted. Predictor 108 sends set of instructions 110 to processor unit 106 for processing. For example, predictor 108 may place set of instructions 110 after conditional instruction 112 in sequence of instructions 128 to be processed by processor unit 106. In one example, sequence of instructions 128 is an instruction pipeline for processor unit 106. In another example, sequence of instructions 128 is an instruction queue of instructions waiting to be processed by processor unit 106.

Conditional instruction 112 is a portion of program 102 containing a statement that when executed by a processor unit results in a choice being made about two or more different paths that should be followed. For example, without limitation, conditional instruction 112 may be a conditional statement, a branching point, and/or a control flow statement. Also, as an example, conditional instruction 112 may include an "if-then" statement or a jump statement. Set of instructions 110 includes instructions needed by processor unit 106 following processing of conditional instruction 112. For example, set of instructions 110 may be a path or branch of program 102.

Because set of instructions 110 may not be known until after conditional instruction 112 has been processed, predictor 108 uses plurality of tables 114. For example, plurality of tables 114 may be loaded into memory 115 for use by predictor 108 during program 102. Predictor 108 can use plurality of tables 114 to predict a result of processing conditional instruction 112 before conditional instruction 112 is finished processing.

Plurality of tables 114 is stored data about a number of times set of branches 116 in program 102 has been used. For example, plurality of tables 114 may contain information regarding each time branch 118 in set of branches 116 could have been used and each time that branch 118 was actually used. Plurality of tables 114 contains a history of use for set of branches 116 in program 102. In one example, plurality of tables 114 is branch history tables.

In these illustrative examples, predictor 108 uses first table 120 to predict set of instructions 110. While predictor 108 is using first table 120, prediction system 104 monitors rate of success 122 in using first table 120. Rate of success 122 is a measurement of the accuracy of prediction by predictor 108 while using first table 120. Rate of success 122 is based on the performance of predictor 108 in correctly predicting instructions needed by processor unit 106 following processing of a conditional instruction. For example, rate of success 122 is the percentage of times that predictor 108 has correctly predicted set of instructions 110 needed by processor unit 106 following processing of conditional instruction 112 for each time that a conditional instruction was processed.

In these illustrative examples, if rate of success 122 falls below threshold number 124, prediction system 104 may look to use a different table in plurality of tables 114 in place of first table 120. In order to select a table in plurality of tables 114, prediction system 104 uses primary table 124. Primary table 124 includes set of markers 126 for identifying which table to use from plurality of tables 114. For example, primary table 124 may be a table that prediction system 104 uses to identify which table in plurality of tables 114 should be used by predictor 108 while processing instructions from program 102. In one example, primary table 124 is a branch history table primer table.

To identify which table to use from plurality of tables 114, prediction system 104 searches sequence of instructions 128 from program 102 that is being processed by processor unit 106 for instruction 130 matching marker 132 in set of markers 126. In these examples, marker 132 is data for identifying instruction 130. For example, marker 132 may be an offset, a pointer, an address, a portion of the code in instruction 130, or any other data for identifying instruction 130. Marker 132 references second table 134. For example, marker 132 may be associated with a pointer, address, offset or other form of identifier for second table 134.

Once instruction 130 is identified, predictor 108 may use second table 134 in place of first table 120. Second table 134 is a table from plurality of tables 114 that should be used by predictor 108 when instruction 130 is identified in sequence of instructions 128. In these illustrative examples, second table 134 is a table that has been created for program 102 for use when instruction 130 has been identified. For example, predictor 108 using second table 134 may improve rate of success 122. Predictor 108 may begin to use first table 120 in place of second table 134 before, during, or after processor unit 106 processes instruction 130. In one illustrative embodiment, predictor 108 uses second table 134 after processor unit 106 processes instruction 130.

The different illustrative embodiments in data processing environment 100 not only utilize first table 120 in predicting instructions, but also utilize primary table 124. Primary table 124 includes set of markers 126 for identifying which table from plurality of tables 114 to use and when to use that table while processing instructions from program 102. Using primary table 124 during program 102 can help improve rate of success 122. As a result, processor unit 106 may not have to flush instructions as often when primary table 124 is not used by prediction system 104 during program 102.

The illustration of data processing environment 100 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, plurality of tables 114 may be included in primary table 124. Markers from set of markers 126 may be linked with tables in plurality of tables 114. When program 102 is loaded into memory 115 associated with processor unit 106, primary table 124 may also be loaded into memory 115. Primary table 124 and plurality of tables 114 may remain in memory 115 the entire time that program 102 is running.

In other illustrative embodiments, prediction system 104 may include solely software embodiments. For example, prediction system 104 may be a process that runs on one or more processor units in data processing environment 100 and predicts instructions needed by processor unit 106. In yet other illustrative embodiments, prediction system 104 may include solely hardware embodiments. For example, prediction system 104 may be circuitry for tracking rate of success 122 following each time a conditional instruction is processed by processor unit 106. Prediction system 104 may also include circuitry for comparing instructions in sequence of instructions 128 with first table 120 and set of markers 126.

Figure 2:
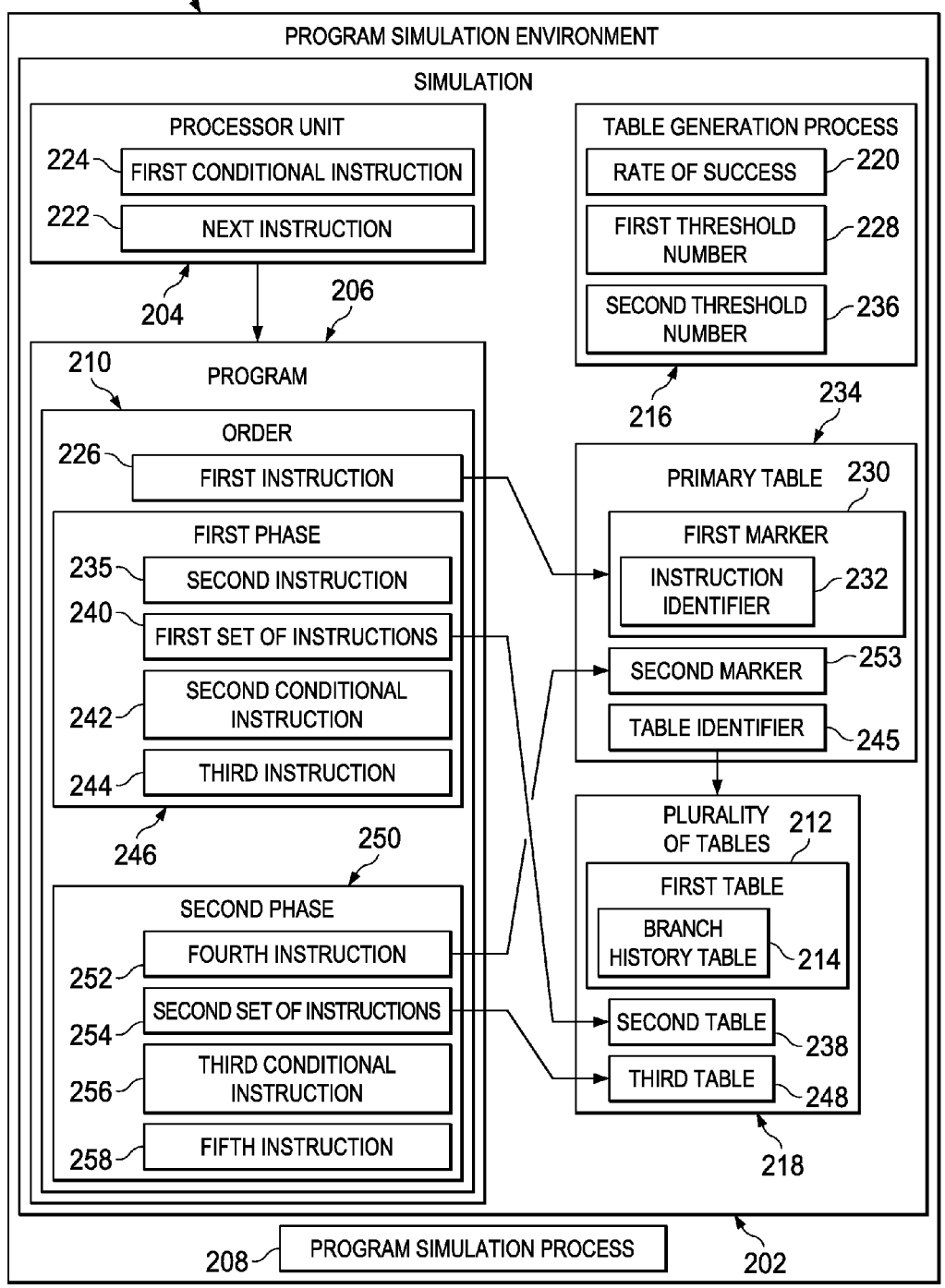
FIG. 2 is a block diagram of a program simulation environment in accordance with an illustrative embodiment.

With reference now to FIG. 2, an illustration of a block diagram of a program simulation environment is depicted in accordance with an illustrative embodiment. In these illustrative examples, program simulation environment 200 is an environment for simulating a program to identify an order that instructions are processed. For example program simulation environment 200 is an environment for developing a primary table, such as, for example, primary table 124 in FIG. 1, to use in predicting instructions.

In these illustrative embodiments, simulation 202 is conducted in program simulation environment 200. Simulation 202 is a representation of how processor unit 204 would process instructions from program 206. For example, simulation 202 may be developed from data regarding previous uses of program 206. In other examples, simulation 202 may be a record of instructions from program 206 processed by processor unit 204. Program simulation process 208 identifies order 210 that instructions from program 206 would be processed by processor unit 204. In these examples, order 210 is the order that instructions from program 206 are processed by processor unit 204 while using first table 212. For example, first table 212 may be branch history table 214.

Table generation process 216 processes order 210 to create tables in plurality of tables 218. Table generation process 216 processes order 210 in the order that processor unit 204 processed instructions from program 206. Table generation process 216 monitors rate of success 220 in order 210. Rate of success 220 is a percentage of times that next instruction 222 needed by processor unit 204 following processing of first conditional instruction 224 was correctly predicted. Table generation process 216 monitors rate of success 220 by going through order 210 to identify each conditional instruction in order 210 and determining whether the instructions following each conditional instruction were correctly predicted.

Table generation process 216 identifies first instruction 226 where rate of success 220 is less than or equal to first threshold number 228. In these examples, first threshold number 228 may be a number or percentage selected by an administrator for a preferred maximum amount of failure in predicting branches. For example, first threshold number 228 may be set based on desired levels of efficiency for processor unit 204.

Table generation process 216 marks first instruction 226 with first marker 230. For example, table generation process 216 records instruction identifier 232 of first instruction 226 into primary table 234. Instruction identifier 232 is data for identifying first instruction 226. For example, instruction identifier 232 may be an offset, a pointer, an address, a portion of the code in first instruction 226, or any other data for identifying first instruction 226.

Once first instruction 226 has been identified, table generation process 216 continues to process down order 210 until second instruction 235. Second instruction 235 is a point in order 210 where rate of success 220 is greater than or equal to second threshold number 236. In one embodiment, second threshold number 236 may be the same as first threshold number 228. In another embodiment, second threshold number 236 may be higher than first threshold number 228. Thus, second instruction 235 may be a point where rate of success 220 is greater than it was at first instruction 226. For example, prediction of branches may have reached desired levels.

Once second instruction 235 has been identified, table generation process 216 begins creating second table 238. Table generation process 216 creates second table 238 by recording first set of instructions 240 needed by processor unit 204 following processing of second conditional instruction 242. Table generation process 216 continues to populate to second table 238 with records of other instructions needed by processor unit 204 following processing of conditional instructions until third instruction 244 is identified. Third instruction 244 is a point in order where rate of success 220 is less than or equal to first threshold number 228. Instruction prediction has dropped below preferred levels and records of instructions are no longer recorded into second table 238.

Table generation process 216 also places table identifier 245 in primary table 234. Table identifier 245 provides a way for a prediction system, such as, for example, prediction system 104 in FIG. 1, to retrieve second table 238 when first marker 230 is identified. Table identifier 245 corresponds with first marker 230 and instruction identifier 232. For example, table identifier 245 may be a pointer, address, offset or other form of identifier for second table 238.

First phase 246 of program 206 includes second instruction 235, third instruction 244 and the instructions between second instruction 235 and third instruction 244. First phase 246 is a part of program 206 where desired values for rate of success 220 may be achieved by using second table 238. Second table 238 is uniquely developed to predict instructions needed by processor unit 204 during first phase 246. The different illustrative embodiments recognize that one table may not accurately predict instructions needed during the entire processing of program 206. The different illustrative embodiments recognize that multiple phases can exist in program 206 where different types of results from conditional instructions are obtained. Thus the different illustrative embodiments simulate program 206 and create plurality of tables 218 for different phases of program 206.

In these illustrative embodiments, table generation process 216 may create third table 248 for second phase 250 in a similar manner as second table 238. For example, continuing down order 210, table generation process 216 identifies fourth instruction 252 having rate of success 220 greater than or equal to second threshold number 236. Table generation process 216 marks fourth instruction 252 with second marker 253 in primary table 234. Table generation process 216 then records second set of instructions 254 needed by processor unit 204 following processing of third conditional instruction 256 into third table 248. Table generation process 216 continues to populate third table 248 until reaching fifth instruction 258 where rate of success 220 is less than or equal to first threshold number 228.

The illustration of program simulation environment 200 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, any number of tables in plurality of tables 218 may be created from any number of different simulations of program 206. For example, first table 212 may be a table previously created by table generation process 216. In subsequent simulations, first table 212 may be improved and/or broken down into two or more tables for different phases of program 206. In other examples, first table 212 may be an empty table that was used during simulation 202 to produce order 210. In some embodiments, table generation process 216 may create tables for commonly used programs or programs that are important to business functions. In other examples, table generation process 216 may create tables for programs when the programs are installed on a computer.

In other illustrative embodiments, any number of different threshold numbers may be established and used by table generation process 216 in creating tables in plurality of tables 218. For example, different programs or different processor units may have different desired levels of efficiency. An administrator may tailor different standards for rate of success 220 based on the program, phase of the program, or the processor unit.

Figure 3:
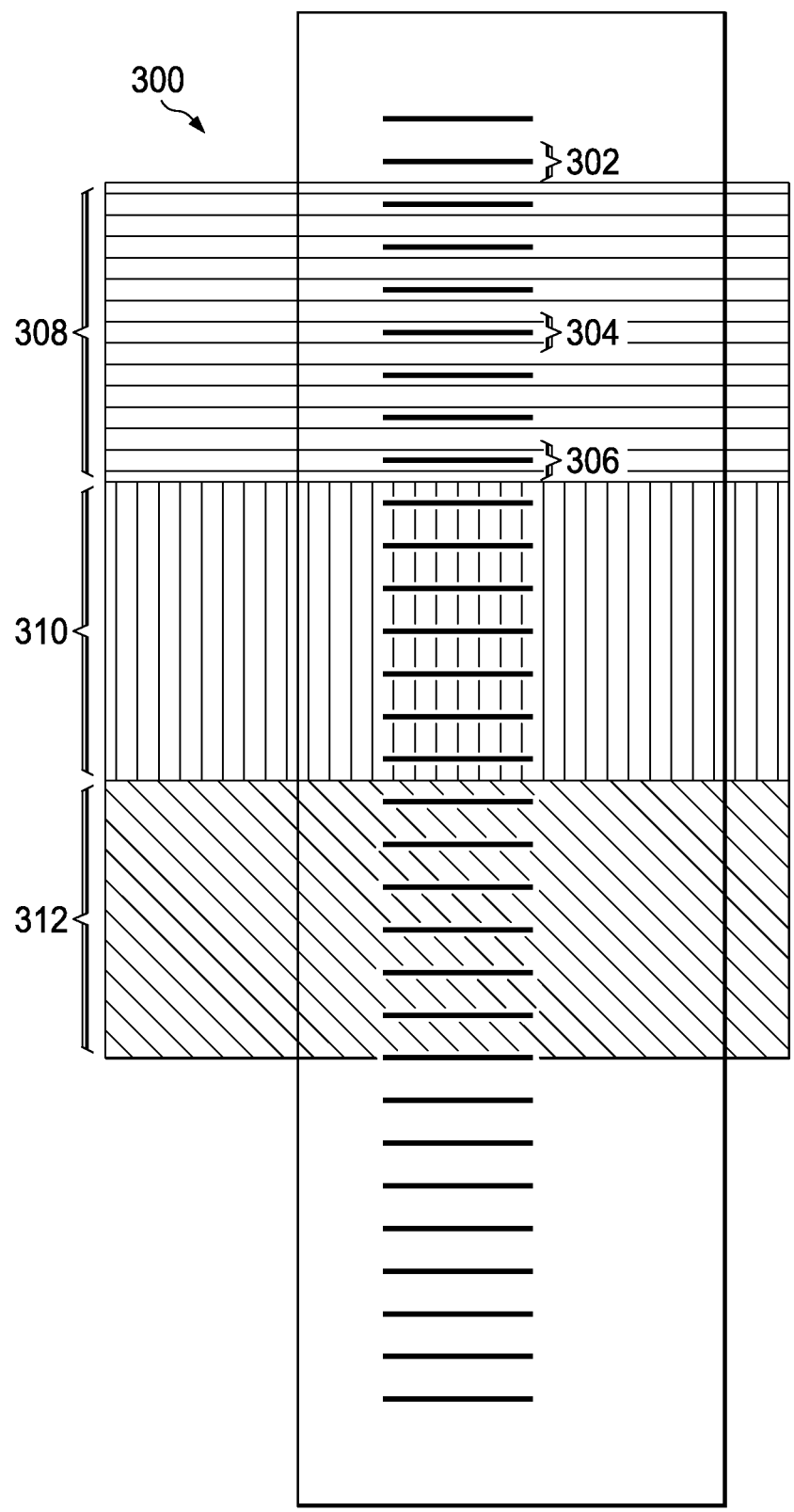
FIG. 3 is an illustration of an execution order of a plurality of instructions of a program in accordance with an illustrative embodiment.

With reference now to FIG. 3, an illustration of an execution order of a plurality of instructions of a program is depicted in accordance with an illustrative embodiment. In this illustrative example, execution order 300 is an example of one embodiment of order 210 from simulation 202 of program 206 in FIG. 2.

In this illustrative example, each line within execution order 300 represents one or more instructions executed by a processor unit. Set of instructions 302 is a point in execution order 300 where success in correctly predicting branches of code needed is less than a desired rate. Set of instructions 304 is a point in execution order 300 where success in correctly predicting branches of code needed has reached desired rates. Set of instructions 306 is a point in execution order 300 where success in correctly predicting branches of code needed is less than a desired rate.

Phase 308 exists between set of instructions 302 and set of instructions 306. Phase 308 is a part of a program where branches of the program may be correctly predicted within desired rates of success using a table, such as, for example, second table 238 in FIG. 2. A prediction system, such as, for example, prediction system 104 in FIG. 1, can identify set of instructions 302 and switch to the table for phase 308. As a result, in future occurrences of set of instructions 302, the success in correctly predicting branches of code needed may reach desired rates more quickly than what occurred in execution order 300.

In these illustrative examples, phase 310 and phase 312 are identified in a similar manner as phase 308. Tables for phase 310 and phase 312 can be used during processing of instructions within phase 310 and phase 312.

With reference now to FIG. 4, an illustration of a branch history table primer table is depicted in accordance with an illustrative embodiment. In this illustrative example, branch history table primer table 400 is an example of one embodiment of primary table 124 in FIG. 1. For example, branch history table primer table 400 is an example of a table for identifying different phases in a program and branch history tables to use during the different phases.

Branch history table primer table 400 includes set of phase markers 402 and set of branch history table identifiers 404. Set of phase markers 402 includes identifiers for identifying instructions in a program that mark the start of a phase of the program. Set of branch history table identifiers 404 includes identifiers of branch history tables for a prediction system to use when a phase marked by one set of phase markers 402 has been identified during processing of a program.

With reference now to FIG. 5, an illustration of a branch history table is depicted in accordance with an illustrative embodiment. In this illustrative example, branch history table 500 is an example of one embodiment of first table 120 in FIG. 1. Branch history table 500 is an example of one embodiment of second table 238 created by table generation process 216 in FIG. 2.

Branch history table 500 includes identifier 502 and history 504. Identifier 502 is an identifier of a branch of a program. For example, identifier 502 may be an offset, a pointer, an address, a portion of the code in the branch, or any other data for identifying the branch. History 504 is a record of times that the branch was either taken or not taken.

In this illustrative example, a "1" indicates that a branch was taken, while a "0" indicates that the branch was not taken. For example, branch 506 was taken the first and fourth time. Thus, a predictor, such as, for example predictor 108 in FIG. 1, may be able to predict from branch history table 500 that branch 506 is taken every third time and branch 508 is taken every second time. On the other hand, branch 510 may be taken every third time but not until the third time, while branch 512 may be taken every second time but not until the second time.

The illustrations of execution order 300 in FIG. 3, branch history table primer table 400 in FIG. 4, and branch history table 500 in FIG. 5 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 6:
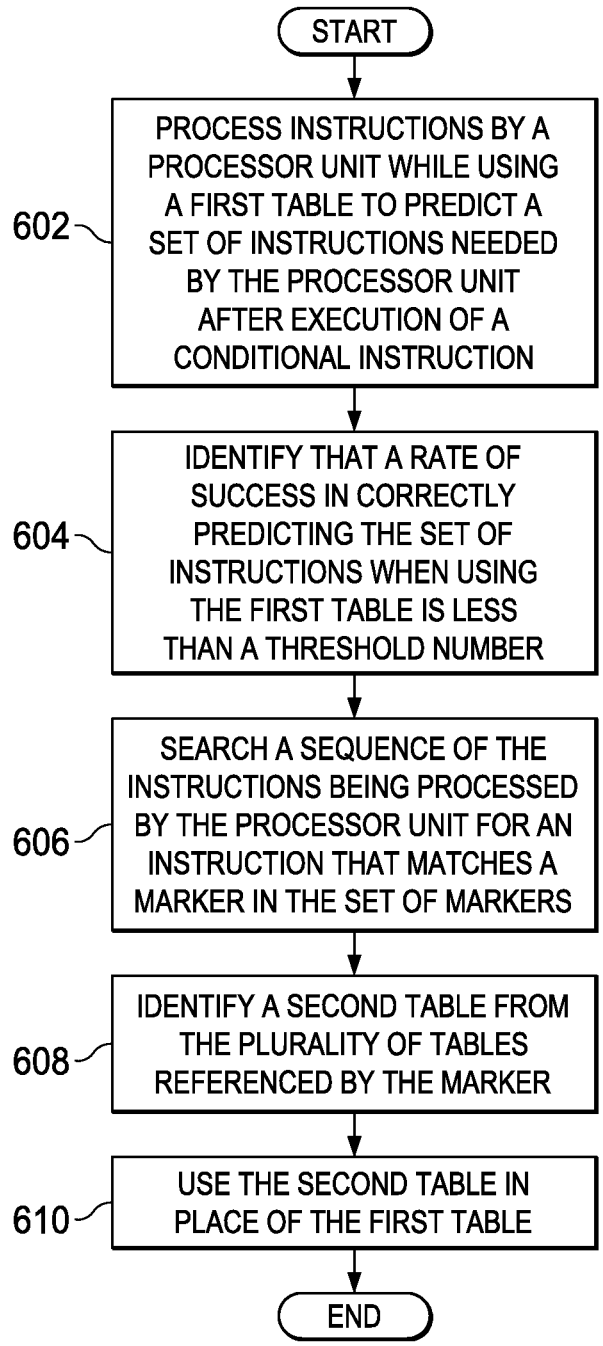
FIG. 6 is a flowchart of a process for processing instructions in accordance with an illustrative embodiment.

With reference now to FIG. 6, an illustration of a flowchart of a process for processing instructions is depicted in accordance with an illustrative embodiment. The process illustrated in FIG. 6 may be implemented by prediction system 104 and predictor 108 in FIG. 1.

The process begins by processing instructions by a processor unit while using a first table to predict a set of instructions needed by the processor unit after execution of a conditional instruction (step 602). The process then identifies that a rate of success in correctly predicting the set of instructions when using the first table is less than a threshold number (step 604). In step 604, the threshold number may be selected by an administrator as a desired minimum level for instruction prediction during a program.

Thereafter, the process searches a sequence of the instructions being processed by the processor unit for an instruction that matches a marker in the set of markers (step 606). In step 606, the instruction may be searched for in instructions that are in a cache waiting to be processed or in a pipeline of a processor unit. The marker identifies a second table that can be used in place of the first table.

The process then identifies a second table from the plurality of tables referenced by the marker (step 608). In step 608, the second table may have been created for a current phase of the program to improve instruction prediction during the current phase. Thereafter, the process uses the second table in place of the first table, with the process terminating thereafter (step 610). In step 610, the first table may be replaced with the second table.

Figure 7:
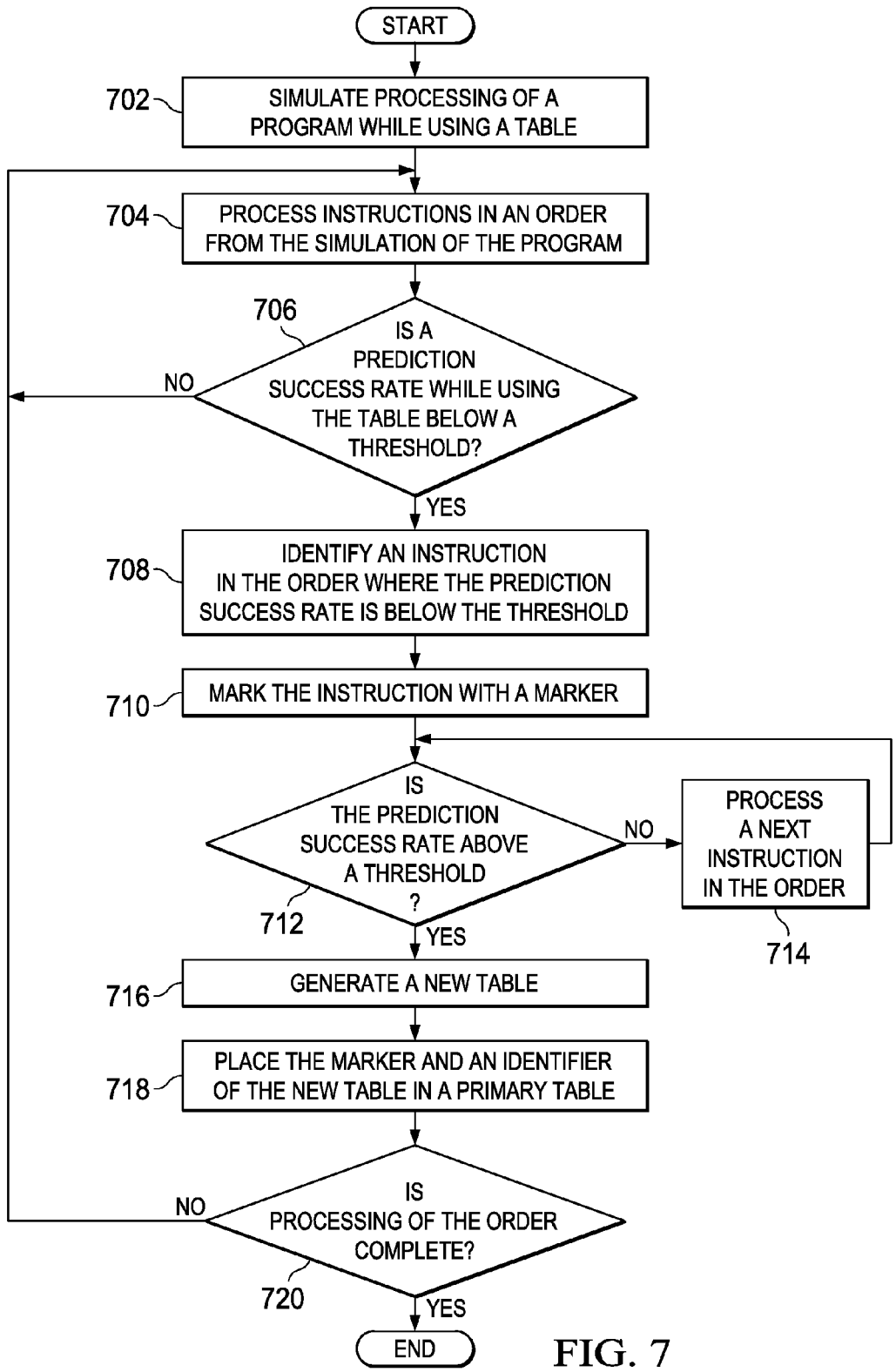
FIG. 7 is a flowchart of a process for creating a primary table from a simulation of a program in accordance with an illustrative embodiment.

With reference now to FIG. 7, an illustration of a flowchart of a process for creating a primary table from a simulation of a program is depicted in accordance with an illustrative embodiment. One or more steps in the process illustrated in FIG. 7 may be implemented by program simulation process 208 and table generation process 216 in FIG. 2.

The process begins by simulating processing of a program while using a table (step 702). In step 702, the simulation may be a previous run of the program. The process then processes instructions in an order from the simulation of the program (step 704). In step 704, the process works down the order that the instructions were processed during the simulation. For example, the instructions may be post-processed to using feedback directed program restructuring to obtain profile information about the branches used in the program.

Thereafter, the process determines whether a prediction success rate while using the table is below a threshold (step 706). If the process determines that the prediction success rate while using the table is not below the threshold, the process returns to step 704 and continues to process the instructions in the order from the simulation of the program. If the process determines that the prediction success rate while using the table is below the threshold, the process identifies an instruction in the order where the prediction success rate is below the threshold (step 708).

The process then marks the instruction with a marker (step 710). In step 710, the marker marks the beginning of a phase of the program. Thereafter, the process determines whether the prediction success rate is above a threshold (step 712). If the process determines that the prediction success rate is not above the threshold, the process processes a next instruction in the order (step 714). In step 714, the process will continue to work down the order until prediction success rate reaches the threshold.

If the process determines that the prediction success rate is above the threshold, the process generates a new table (step 716). In step 716, the new table contains a record of instances that branches in the program were either taken or not taken. The process then places the marker and an identifier of the new table in a primary table (step 718). In step 718, the primary table is a table for priming the use of the appropriate branch history table at the appropriate times.

Thereafter, the process determines whether processing of the order is complete (step 720). If the process determines that processing of the order is not complete, the process returns to step 704 and continues to process the instructions in the order from the simulation of the program. If the process determines that processing of the order is complete, the process terminates thereafter.

Figure 8:
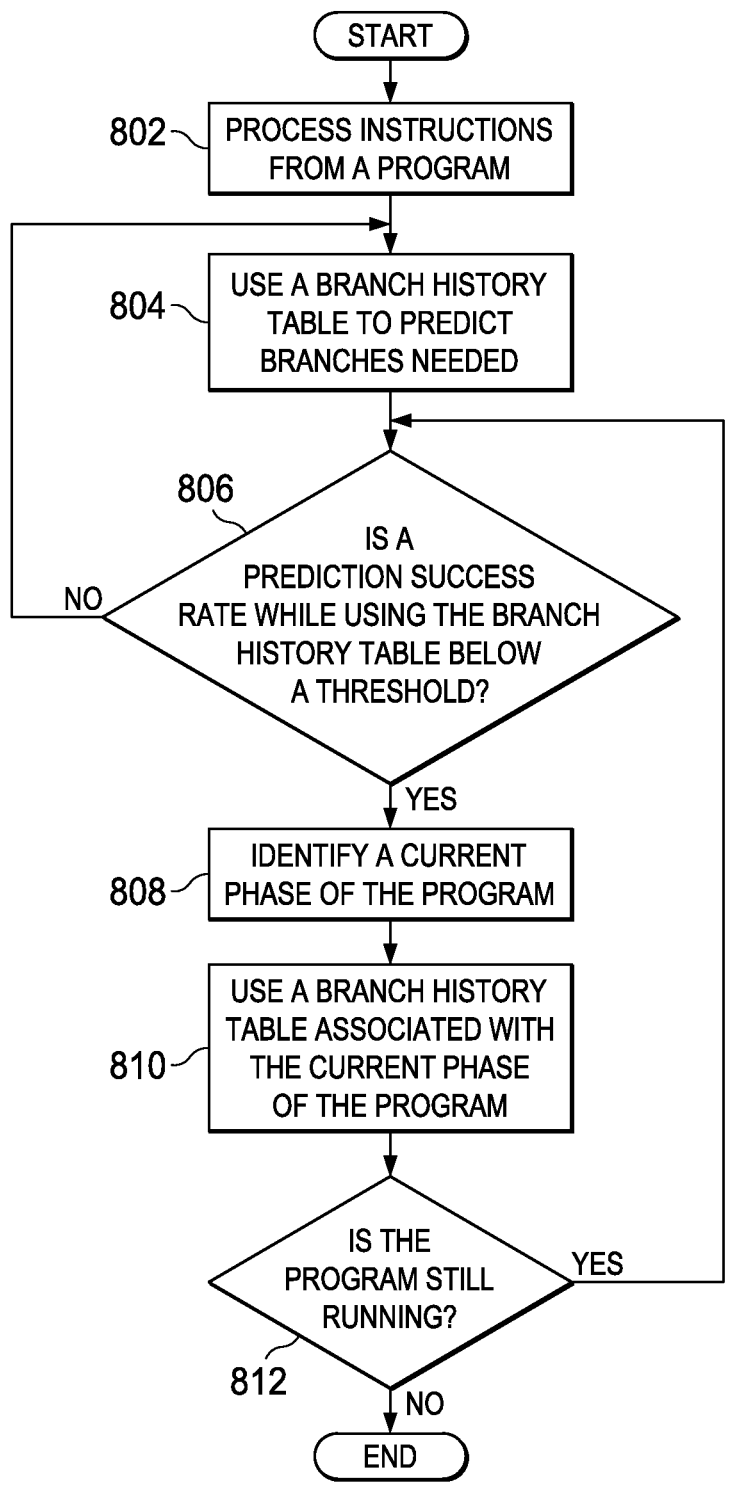
FIG. 8 is a flowchart of a process for using a branch history table to predict branches in accordance with an illustrative embodiment.

With reference now to FIG. 8, an illustration of a flowchart of a process for using a branch history table to predict branches is depicted in accordance with an illustrative embodiment. The process illustrated in FIG. 8 may be implemented by prediction system 104 and predictor 108 in FIG. 1.

The process begins by processing instructions from a program (step 802). The process then uses a branch history table to predict branches needed (step 804). In step 804, the branches predicted will be needed by a processor unit following processing of a conditional instruction based on the result of the conditional instruction. Thereafter, the process determines whether a prediction success rate while using the branch history table is below a threshold (step 806). In step 806, regardless of what the current phase of the program is, if the prediction success rate is above desired levels there may be no need to change tables. If the process determines that the prediction success rate while using the branch history table is not below the threshold, the process returns to step 804 and continues to use the branch history table to predict branches needed.

If, however, the process determines that the prediction success rate while using the branch history table is below the threshold, the process identifies a current phase of the program (step 808). In step 808, the current phase is identified by locating instructions being processed by the processor unit that match phase markers in a branch history table primer table. The process then uses a branch history table associated with the current phase of the program (step 810).

Thereafter, the process determines whether the program is still running (step 812). If the process determines that the program is still running, the process returns to step 806 and determines whether the prediction success rate while using the branch history table is below a threshold. As long as the program is still running, the prediction success rate may be monitored. If the process determines that the program is not still running, the process terminates thereafter.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 9, an illustration of a block diagram of a data processing system is depicted in accordance with an illustrative embodiment. In this illustrative example, data processing system 900 includes communications fabric 902, which provides communications between processor unit 904, memory 906, persistent storage 908, communications unit 910, input/output (I/O) unit 912, and display 914. In these illustrative examples, data processing system 900 is an example of one implementation of data processing environment 100 in FIG. 1. Data processing system 900 is also one example of example of one implementation of program simulation environment 200 in FIG. 2.

Processor unit 904 serves to process instructions for software that may be loaded into memory 906. In these illustrative examples, processor unit 904 is an example of one implementation of processor unit 106 in FIG. 1. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for processing by processor unit 904. The processes of the different embodiments may be performed by processor unit 904 using computer implemented instructions, which may be located in a memory, such as memory 906.

These instructions are referred to as program code, computer usable program code, or computer readable program code that may be read and processed by a processor in processor unit 904. The program code in the different embodiments may be embodied on different physical or tangible computer readable media, such as memory 906 or persistent storage 908.

Program code 918 is located in a functional form on computer readable media 920 that is selectively removable and may be loaded onto or transferred to data processing system 900 for processing by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these illustrative examples, computer readable storage media 924 is a non-transitory computer readable storage medium.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

In these illustrative examples, program code 918 may include program code for processing an order of instructions from a program and generating tables, such as, for example, table generation process 216 in FIG. 2. Program code 918 may include program code for generating a simulation of an order instructions from a program would be executed in while using a first table, such as, for example, program simulation process 208 in FIG. 2.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

As another example, a storage device in data processing system 900 is any hardware apparatus that may store data. Memory 906, persistent storage 908, and computer readable media 920 are examples of storage devices in a tangible form.

The different illustrative embodiments recognize and take into account that it may be desirable to use an instruction pipeline while processing instructions from a program. Different illustrative embodiments recognize and take into account that successful branch prediction can have an impact in the efficiency of a processor unit using an instruction pipeline. Further, the different illustrative embodiments recognize and take into account that branch history tables may be used to predict branches that will be used.

However, the different illustrative embodiments recognize that branch prediction in different phases of a program may not be accurately achieved using a one single branch history table. The different illustrative embodiments create branch history tables for different phases of a program from simulations of the programs. The different illustrative embodiments provide ways for identifying when to use a different branch history table and which branch history table should be used.

Thus, the illustrative embodiments provide a data processing system and computer program product for processing instructions. The instructions are processed by a processor unit while using a first table in a plurality of tables to predict a set of instructions needed by the processor unit after processing of a conditional instruction. An identification is formed that a rate of success in correctly predicting the set of instructions when using the first table is less than a threshold number. A sequence of the instructions being processed by the processor unit is searched for an instruction that matches a marker in a set of markers for identifying when to use the plurality of tables. An identification that the instruction that matches the marker is formed. A second table from the plurality of tables referenced by the marker is identified. The second table is used in place of the first table.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for processing instructions, the computer program product comprising:
 a set of computer-readable storage devices;
 program code, stored on one of the set of computer-readable storage devices, configured to identify an order that the instructions would be executed by a processor unit during a simulation of a program while using a first table to predict a set of instructions needed by the processor unit after processing of a conditional instruction;
 program code, stored on one of the set of computer-readable storage devices, configured to identify a first instruction in the order where a first rate of success in predicting a next instruction needed by the processor unit after a first conditional instruction was less than a first threshold number;
 program code, stored on one of the set of computer-readable storage devices, configured to create a primary table having a set of table identifiers and a set of instruction identifiers, wherein the set of instruction identifiers identify instructions that mark a start of different phases of the program and the set of table identifiers identify tables to use for the different phases of the program;
 program code, stored on one of the set of computer-readable storage devices, configured to store information about a first set of instructions appearing in the order after a second conditional instruction into a second table, store an instruction identifier for the instruction as a marker in the primary table, and store a table identifier for the second table in association with the marker in the primary table in response to identifying the first instruction; and program code, stored on one of the set of computer-readable storage devices, configured to load the primary table during processing of the program for determining when to use the second table.

2. The computer program product of claim 1 further comprising:

program code, stored on one of the set of computer-readable storage devices, configured to identify a second instruction where the first rate of success was greater than or equal to a second threshold number in response to identifying the first instruction; and program code, stored on one of the set of computer-readable storage devices, configured to begin the storing of the information about the first set of instructions appearing in the order after the second conditional instruction into the second table in response to identifying the second instruction.

3. The computer program product of claim 1 further comprising:

program code, stored on one of the set of computer-readable storage devices, configured to complete the storing of the information into the second table in response to identifying a third instruction in the order where the first rate of success was less than the first threshold number; and program code, stored on one of the set of computer-readable storage devices, configured to start a third table referenced by a second marker in the primary table in response to identifying a fourth instruction where the first rate of success was greater than or equal to a second threshold number.

4. The computer program product of claim 3 further comprising:

program code, stored on one of the set of computer-readable storage devices, configured to identify a phase of the program as the instructions appearing in the order after the first instruction and including the third instruction; and program code, stored on one of the set of computer-readable storage devices, configured to load the second table for use during processing of the phase of the program.

5. The computer program product of claim 1, wherein the first table is a branch history table comprising a record of instances that a set of branches was one of taken and not taken following execution of a set of conditional instructions.

6. An apparatus for processing instructions, the apparatus comprising:

a processor unit configured to process the instructions; and a prediction system in communication with the processor unit and configured to predict a set of instructions needed by the processor unit after processing of a conditional instruction using a first table in a plurality of tables comprising a record of instances when the set of instructions were needed by the processor unit after processing of the conditional instruction; provide the set of instructions to the processor unit prior to the processor unit completing processing of the conditional instruction; search a sequence of the instructions being processed by the processor unit for an instruction that matches a marker in a set of markers for identifying when to use the plurality of tables in response to identifying that a rate of success in correctly predicting the set of instructions when using the first table is less than a threshold number; identify a second table from the plurality of tables referenced by the marker in response to identifying the instruction that matches the marker; and use the second table in place of the first table, wherein the prediction system is further configured to access a primary table having a set of table identifiers and a set of instruction identifiers, wherein the set of instruction identifiers identify instructions that mark a start of different phases of a program and the set of table identifiers identify tables to use for the different phases of the program; and use tables identified by the set of table identifiers during the different phases of the program.

7. The apparatus of claim 6, wherein the prediction system is further configured to use the second table to predict the set of instructions needed by the processor unit after processing of the instruction that matches the marker.

8. The apparatus of claim 6, wherein the first table is a branch history table comprising a record of instances that a set of branches was one of taken and not taken following execution of a set of conditional instructions.

* * * * *